US012700001B2

(12) United States Patent
Priyani et al.

(10) Patent No.: US 12,700,001 B2
(45) Date of Patent: Aug. 4, 2026

(54) USER AUTHENTICATION DURING AN ELECTRONIC SIGNATURE WORKFLOW

(71) Applicant: FMR LLC, Boston, MA (US)

(72) Inventors: Saloni Priyani, Pittsburgh, PA (US);
Prakhar Maheshwari, Bengaluru (IN);
Samir Kakkar, Bengaluru (IN);
Shruthi Kulkarni, Bengaluru (IN);
Vipul Grover, Nashua, NH (US);
Harshal Gordhandas Morparia,
Lexington, MA (US); **Vineela
Gorentla**, Bengaluru (IN)

(73) Assignee: FMR LLC, Boston, MA (US)

( * ) Notice: Subject to any disclaimer, the term of this patent is extended or adjusted under 35 U.S.C. 154(b) by 265 days.

(21) Appl. No.: 18/507,724

(22) Filed: Nov. 13, 2023

(65) Prior Publication Data

US 2025/0156866 A1     May 15, 2025

(51) Int. Cl.
*G06Q 20/40*          (2012.01)
*G06Q 20/38*          (2012.01)

(52) U.S. Cl.
CPC ..... *G06Q 20/4014* (2013.01); *G06Q 20/3825* (2013.01); *G06Q 20/4016* (2013.01)

(58) Field of Classification Search
None
See application file for complete search history.

(56) References Cited

U.S. PATENT DOCUMENTS 9,426,137 B2    8/2016   Caceres et al.
9,912,657 B2    3/2018   Dasgupta et al.

10,015,156 B2   7/2018   Jones-McFadden et al.
10,212,588 B2   2/2019   Grim et al.
11,637,835 B2   4/2023   Liem et al.
11,710,573 B2   7/2023   Radha et al.
2016/0087957 A1  3/2016   Shah et al.
(Continued)

OTHER PUBLICATIONS

P. Cunningham and S.J. Delaney, "k-Nearest Neighbour Classifiers 2nd Edition (with Python examples)," arXiv:2004.04523v2 [cs.LG] Apr. 29, 2020, available at https://arxiv.org/pdf/2004.04523.pdf, 22 pages.

(Continued)

*Primary Examiner* — Courtney P Jones
*Assistant Examiner* — Nicholas K Phan
(74) *Attorney, Agent, or Firm* — Cesari and McKenna, LLP

(57)          ABSTRACT

Methods and apparatuses are described for user authentication during an electronic signature workflow. A server authenticates user credentials included in an electronic signature request. The server generates activity variables based upon parameters associated with the electronic signature request. The server creates a multidimensional vector using the activity variables. The server executes a trained machine learning classification model on the multidimensional vector to generate an anomaly score for the electronic signature request. The server determines additional authentication requirements for the electronic signature request based upon the anomaly score. The server initiates the additional authentication requirements for the electronic signature request, including validating user authentication data received from remote computing devices.

28 Claims, 5 Drawing Sheets

(56) References Cited

U.S. PATENT DOCUMENTS

| 2020/0401901 | A1 | 12/2020 | Radha et al. | |
| 2021/0400048 | A1 | 12/2021 | Liem et al. | |
| 2022/0075856 | A1 | 3/2022 | Whaley et al. | |
| 2022/0224683 | A1 | 7/2022 | Solano Gomez et al. | |
| 2023/0138035 | A1* | 5/2023 | Lott | G06Q 20/4014 |
| | | | | 705/44 |
| 2023/0199006 | A1* | 6/2023 | Gurnov | H04L 63/1425 |
| | | | | 726/23 |

OTHER PUBLICATIONS

"Determining the number of clusters in a data set," Wikipedia, available at https://en.wikipedia.org/wiki/Determining_the_number_of_clusters_in_a_data_set, dated Aug. 14, 2023, 6 pages.

* cited by examiner

100

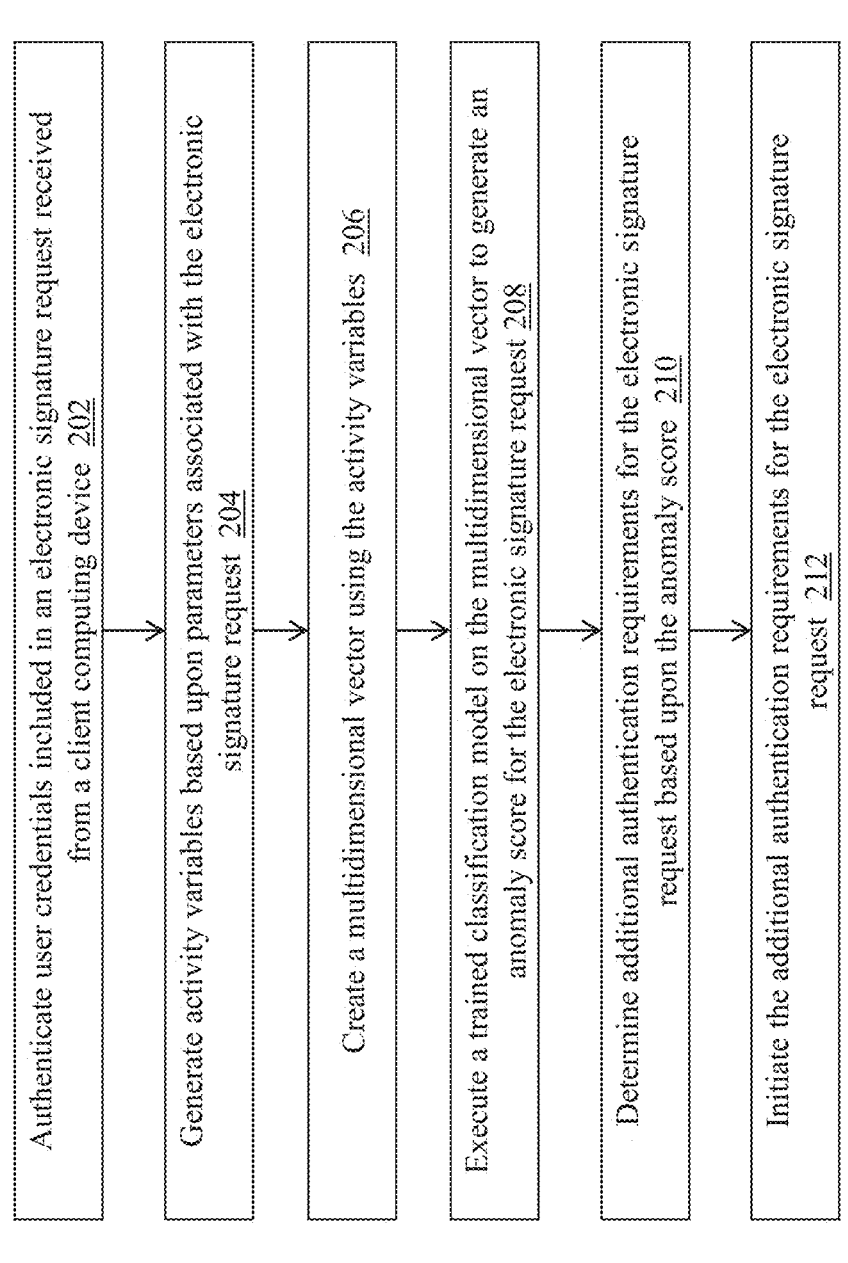

Authenticate user credentials included in an electronic signature request received from a client computing device 202

Generate activity variables based upon parameters associated with the electronic signature request 204

Create a multidimensional vector using the activity variables 206

Execute a trained classification model on the multidimensional vector to generate an anomaly score for the electronic signature request 208

Determine additional authentication requirements for the electronic signature request based upon the anomaly score 210

Initiate the additional authentication requirements for the electronic signature request 212

USER AUTHENTICATION DURING AN ELECTRONIC SIGNATURE WORKFLOW

TECHNICAL FIELD

This application relates generally to methods and apparatuses, including computer program products, for user authentication during an electronic signature workflow, including the use of machine learning classification models to analyze and validate user activity characteristics.

BACKGROUND

Many organizations—such as corporations, banks, government and regulatory agencies, and financial services advisors—are required to prepare complex, multi-sectioned digital documents such as agreements for execution by customers or other entities. Often, the generation and signing of these digital documents occurs during an automated e-signature application workflow, where a user at a client computing device interacts with a remote computing system operated by the organization to review and electronically sign formal documents. Because the customer electronically signing the documents is not physically present (e.g., in a branch location), it is critical to authenticate the customer's identity before allowing the customer to finalize the document signing transaction.

Unfortunately, the increase in electronic communications has also given rise to an increase in malicious activity in the form of spoofing attacks, where a malignant actor attempts to impersonate a real customer and/or obtain unauthorized access to an organization's computing system to carry out theft or fraud on the organization. Most enterprise computing systems have limited user authentication processes, such as validating a simple username and password provided by the user (which can be easily intercepted or hacked). For particularly sensitive transactions, it may be desirable to have a different (i.e., more stringent) level of user authentication requirements but many computing systems are unable to dynamically augment the level of user authentication required.

SUMMARY

Therefore, what is needed are methods and systems that utilize advanced machine learning (ML) classification models to automatically evaluate parameters derived from computing hardware and/or software involved in a document signing request and determine a level of risk associated with the request based upon historical user authentication information. The technique described herein advantageously provide for a trained ML classification model that is configured to predict an anomaly score for an electronic signing request from a client computing device, and select a level of additional user authentication requirements to be carried out based upon the anomaly score. In addition, the trained ML classification model can be re-trained over time—including tuning changes to weight values of the model—to provide a more accurate determination of risk as additional data is received. As can be appreciated, the methods and systems described herein capture and assess certain system and/or device parameters (that are not easily replicated by fraudsters) associated with a current access request in reference to historical authentication data to identify anomalous access requests.

The invention, in one aspect, features a system for user authentication during an electronic signature workflow. The system includes a server computing device having a memory for storing computer-executable instructions and a processor that executes the computer-executable instructions. The server computing device authenticates user credentials included in an electronic signature request received from a client computing device. The server computing device generates a plurality of activity variables based upon parameters associated with the electronic signature request. The server computing device creates a multidimensional vector using the activity variables, the vector including a plurality of values each associated with an activity variable and having a weight assigned to each value. The server computing device executes a trained machine learning classification model on the multidimensional vector to generate an anomaly score for the electronic signature request. The server computing device determines additional authentication requirements for the electronic signature request based upon the anomaly score. The server computing device initiates the additional authentication requirements for the electronic signature request, including validating user authentication data received from one or more remote computing devices.

The invention, in another aspect, features a computerized method of user authentication during an electronic signature workflow. A server computing device authenticates user credentials included in an electronic signature request received from a client computing device. The server computing device generates a plurality of activity variables based upon parameters associated with the electronic signature request. The server computing device creates a multidimensional vector using the activity variables, the vector including a plurality of values each associated with an activity variable and having a weight assigned to each value. The server computing device executes a trained machine learning classification model on the multidimensional vector to generate an anomaly score for the electronic signature request. The server computing device determines additional authentication requirements for the electronic signature request based upon the anomaly score. The server computing device initiates the additional authentication requirements for the electronic signature request, including validating user authentication data received from one or more remote computing devices.

Any of the above aspects can include one or more of the following features. In some embodiments, the user credentials comprise one or more of: a username, a password, a personal identification number (PIN), and a token. In some embodiments, the parameters associated with the electronic signature request comprise one or more of: an IP address of the client computing device, a MAC address of the client computing device, location coordinates associated with the client computing device, a transaction type, a request timestamp, and the user credentials. In some embodiments, the activity variables comprise a change in the IP address, a proximity of the IP address to a prior IP address of the client computing device, a proximity of the IP address to a postal address of the user, a deviation of the request timestamp from an expected request timestamp, a deviation of the transaction type from an expected transaction type, a change in the user credentials, an account lock event associated with the user, account activity associated with the user, and identification of the transaction type on a predetermined list of transactions.

In some embodiments, the trained machine learning classification model comprises a K-nearest neighbor (KNN) algorithm. In some embodiments, the trained machine learning classification model generates the anomaly score based upon a distance measure between each of the weighted values of the multidimensional vector and values of one or more centroid vectors associated with the user. In some embodiments, the centroid vector is based upon historical authentication activity associated with one or more of: the user and the client computing device. In some embodiments, the server computing device retrains the trained machine learning classification model on updated user authentication data to derive new weights for multidimensional vectors.

In some embodiments, the server computing device determines that no additional authentication requirements for the electronic signature request are required when the anomaly score falls below a predefined value. In some embodiments, the server computing device determines that multifactor authentication is required when the anomaly score is above a first threshold value. In some embodiments, initiating the additional authentication requirements for the electronic signature request comprises instructing a first remote computing device to issue a multifactor authentication request to the client computing device. In some embodiments, validating user authentication data received from one or more remote computing devices comprises receiving an indicator from the first remote computing device that the client computing device has successfully responded to the multi-factor authentication request.

In some embodiments, the server computing device determines that active identity proofing is required when the anomaly score is above a second threshold value. In some embodiments, initiating the additional authentication requirements for the electronic signature request comprises instructing a second remote computing device to request information comprising one or more of: personal information, identification document information, and biometric identity information from the user of the client computing device. In some embodiments, validating user authentication data received from one or more remote computing devices comprises receiving an indicator from the second remote computing device that the user has successfully responded to the information request.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 2 is a flow diagram of a computerized method of user authentication during an electronic signature workflow.

DETAILED DESCRIPTION

Figure 1:
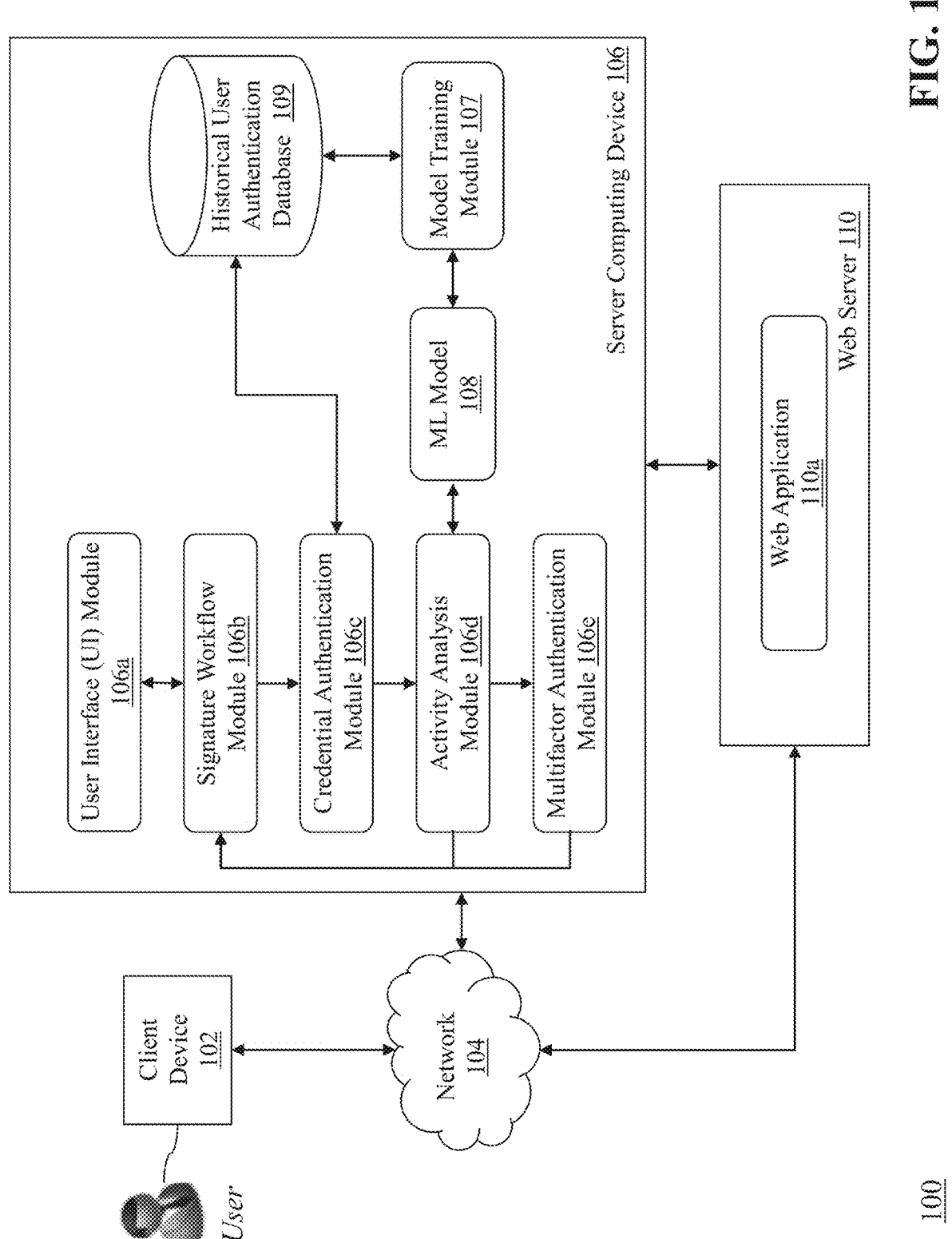
FIG. 1 is a block diagram of a system for user authentication during an electronic signature workflow.

FIG. 1 is a block diagram of system 100 for user authentication during an electronic signature workflow. System 100 includes client computing devices 102a, 102b, communication network 104, server computing device 106 that includes user interface (UI) 106a, signature workflow module 106b, credential authentication module 106c, activity analysis module 106d, multifactor authentication module 106e, model training module 107, machine learning (ML) classification model 108, and historical user authentication database 109, and web server computing device 110 that includes web application 110a.

Client computing device 102 connects to communication network 104 in order to communicate with web server computing device 110 to participate in a session with web application 110a. As can be appreciated, web server 110 can be configured to host and serve one or more applications or websites, and/or connect to other computing devices that provide content to client computing device 102. For example, client computing device 102 can establish a communication session with web server 110 (e.g., via HTTP or HTTPS) using a uniform resource locator (URL) assigned to web server 110 and access application functions provided by web application 109a. A user at client computing device 102 can interact with web application 110a by activating links and navigating through various user interfaces and/or webpages generated by web application 110a that comprise the application functions. An exemplary application function can be an electronic document signing workflow, where the user at client device 102 reviews electronic documents and provides an e-signature to complete the signing process—although it should be appreciated that other types of application functions can be contemplated within the scope of the technology described herein. In some embodiments, each webpage, application function, and/or user interface is associated with a particular URL. In some embodiments, client computing device 102 is coupled to an associated display device (not shown). For example, client computing device 102 can provide a graphical user interface (GUI) via the display device that is configured to receive input from a user of the device 102 and to present output (e.g., content or functions provided by application 110a) to that user. In some embodiments, client computing device 102 can be configured to connect to server computing device 106 via network 104.

Exemplary client computing devices 102 include but are not limited to desktop computers, laptop computers, tablets, mobile devices, smartphones, smart watches, Internet-of-Things (IoT) devices, and internet appliances. It should be appreciated that other types of computing devices that are capable of connecting to the components of system 100 can be used without departing from the scope of invention. Although FIG. 1 depicts a single client computing device 102, it should be appreciated that system 100 can include any number of client computing devices.

Communication network 104 enables client computing device 102, server computing device 106, and web server computing device 110 to communicate with each other. Network 104 is typically a wide area network, such as the Internet and/or a cellular network. In some embodiments, network 104 is comprised of several discrete networks and/or sub-networks (e.g., cellular to Internet).

Server computing device 106 is a computer including specialized hardware and/or software modules that execute on one or more processors and interact with one or more memory modules of server computing device 106, to receive data from other components of system 100, transmit data to other components of system 100, and perform functions for user authentication during an electronic signature workflow as described herein. Server computing device 106 includes several computing modules 106a-106e and 107 that execute on the one or more processors of server computing device 106. In some embodiments, modules 106a-106e and 107 are specialized sets of computer software instructions programmed onto one or more dedicated processors in server computing device 106 and can include designated memory locations and/or registers for executing the specialized computer software instructions.

Although modules 106a-106e and 107 are shown in FIG. 1 as executing within the same server computing device 106, in some embodiments the functionality of modules 106a-106e and 107 can be distributed among a plurality of server computing devices. As shown in FIG. 1, server computing device 106 enables modules 106a-106e and 107 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of modules 106a-106e and 107 is described in detail below.

Server computing device 106 also includes machine learning (ML) classification model 108 coupled to modules 106a-106e and 107 of server computing device 106. In some embodiments, classification model 108 comprises a supervised learning algorithm (e.g., k-nearest neighbor) that is trained on historical user interaction data from database 109 to predict whether a given electronic signature request submitted by a client computing device (e.g., device 102) is normal or anomalous in view of the historical data. It should be appreciated that, ML classification model 108 can comprise other supervised or unsupervised learning algorithms and frameworks, such as neural networks, clustering algorithms, regression models, and similar techniques, without departing from the scope of the technology described herein.

Historical user authentication database 109 is configured to receive, generate, and store specific segments of data relating to the process of user authentication during an electronic signature workflow as described herein. In some embodiments, all or a portion of database 109 can be integrated with server computing device 106 (as shown in FIG. 1) or database 109 can be located on a separate computing device or devices. Database 109 includes historical user authentication data, which in some embodiments is a dedicated section of the database 109 that contains specialized data used by other components of system 100. Generally, the historical user authentication data comprises data elements associated with prior authentication attempts (successful and unsuccessful) of users requesting access to web server 109 via a client computing device (e.g., device 102). For example, database 109 can store information such as IP address(es) of requesting devices. MAC address(es) of requesting devices, location coordinates associated with requesting devices, a transaction type, a request timestamp, user credentials, and other types of hardware, software, networking, and/or messaging attributes The historical user authentication data can be used by model training module 107 in training the ML models 108a-108n as described in detail later in the specification.

FIG. 2 is a flow diagram of a computerized method 200 of user authentication during an electronic signature workflow, using system 100 of FIG. 1. A user at client computing device 102 can launch a locally installed application (e.g., mobile app, browser software) to connect to web server 110 and access functionality of web application 110a, in order to perform a variety of tasks such as information retrieval and transaction execution, among others. In some embodiments, web application 110a utilizes modules 106a-106e of server computing device 106 as part of the functions provided to client computing device 102—for example, web application 110a can invoke UI module 106a to generate user interface screens for display on client computing device 102. In another example, web application 110a can invoke signature workflow module 106b to conduct the electronic signature workflow described herein. Additional detail about the functionality of modules 106a-106e is provided throughout the specification.

As mentioned above, an exemplary task can be the initiation and completion of an electronic document signing workflow, where the user at client computing device 102 accesses web application 110a to review and sign electronic documents (e.g., financial account documents, legal documents, and the like). To initiate the electronic document signing workflow, client computing device 102 establishes a communication session with web server 109 and transmits indicia to web application 110a to initiate the electronic signature workflow. Web application 110a invokes user interface module 106a of server computing device 106 to generate and display a user interface on client computing device 102 that requests user authentication credentials from the user of device 102. Web application 110a also invokes signature workflow module 106b to initiate the electronic signing workflow process for the user.

In response to the request, client computing device 102 transmits user credentials for authentication to web application 110a as part of an electronic signature request. Generally, the user credentials comprise one or more data elements associated with the user of client computing device 102 in order to verify the identity of the user and/or confirm that the user has permission to perform the requested electronic signature workflow. Exemplary user credentials include, but are not limited to, username, password, PIN, authentication token, one-time passcode, and other types of user authentication data. For example, web application 109a can prompt the user at client device 102 to provide certain type(s) of user authentication data and, in response to the prompt, client computing device 102 transmits the electronic signature request with authentication data to web application 110a, which transmits the user credentials to signature workflow module 106b of server computing device 106. Signature workflow module 106b passes the user credentials to credential authentication module 106c.

Credential authentication module 106c authenticates (step 202) the user credentials included in the electronic signature request. In some embodiments, module 106c can compare the received user credentials with one or more credentials for the user as stored in, e.g., database 109. For example, database 109 can store an encrypted username and password for the user in a user profile. Credential authentication module 106c can select the user profile for the user (based upon, e.g., identifying information and/or session credentials received from client computing device). Module 106c decrypts the username and password stored in the user profile and compares the decrypted information with the user credentials provided from client computing device 102. When the respective credentials match, credential authentication module 106c indicates to web application 110a that the user is successfully authenticated. When the credentials do not match, module 106c provides a corresponding indication to web application 110a, which can ask the user to re-enter the credentials, terminate the electronic signature workflow, or other types of actions. It should be appreciated that the above-described user authentication process is exemplary, and other methodologies for performing user authentication can be contemplated for use with the technology described herein.

After successful user authentication, web application 110a invokes activity analysis module 106d to perform one or more additional levels of user authenticity verification based upon certain variables that correspond to the client computing device 102 and/or the electronic signature request activity. In some embodiments, activity analysis module 106d uses parameters available in applications designed for web and/or mobile app contexts (such as parameters associated with or included in the electronic signature request received from client computing device 102) to generate (step 204) a plurality of activity variables used to perform the additional user authentication described herein.

Generally, the parameters associated with the electronic signature request can be data elements that provide contextual information associated with client device 102 and the electronic signature request that can be useful for authentication when analyzed in relation to historical activity data. For example, the parameters can include (but are not limited to) hardware parameters associated with client computing device 102 (e.g., IP address, MAC address, device identifier, device name), software parameters associated with client computing device 102 (e.g., operating system version, application version), location parameters associated with a location of the client computing device 102 (e.g., GPS coordinates), timestamp of the request, transaction type associated with the electronic signature, and the user credentials as provided from the user. Activity analysis module 106d can capture the parameters from the electronic signature request and/or from web application 110a during initiation and/or execution of the electronic signature workflow.

As mentioned above, activity analysis module 106d generates (step 204) a plurality of activity variables based upon the parameters. Generally, the plurality of activity variables are generated using one or more metrics, calculations, algorithms, and/or evaluation criteria as applied to the parameters, in view of historical user authentication data stored in database 109. As just one example, activity analysis module 106d can generate one or more activity variables using an IP address of client computing device 102 as captured in the current electronic signature request in comparison to IP address(es) of client computing device 102 as captured in historical electronic signature requests (or other transactions with web application 110a). As can be appreciated, a change in IP address could indicate that a fraudulent actor is using client computing device 102 and/or attempting to spoof the user in accessing web application 110a. In this example, the activity variable can be labeled 'Change in IP Address' and module 106d can determine whether the current IP address of client computing device 102 is the same as (or different from) a historical IP address. The activity variables can be arranged in one or more categories associated with a type of the activity variable.

In some embodiments, generation of an activity variable can be related to or dependent upon the value of another activity variable. For example, when the value for activity variable for 'Change in IP Address' is true (meaning that the IP address of client computing device 102 has changed from historical data), module 106d can evaluate another activity variable for 'Proximity of IP Addresses,' which is a measure of the geographic proximity of the current IP address and the historical IP address. In some embodiments, module 106d can utilize an IP-based geolocation algorithm to associate an IP address with a real-world location; for example, module 106d can map an IP address or MAC address to the real-world geographic location of an Internet-connected computing or a mobile device—including country, region (city), latitude/longitude, ISP, and domain name among others. Module 106d can then use any of a number of different metrics to determine a distance between the IP address geolocations (e.g., miles, kilometers, time zones, etc.). As can be understood, when the current IP address is close in proximity to the historical IP address(es), it may be considered as a lower risk of fraudulent activity than a case where the current IP address is geographically distant from the historical IP address(es). Module 106d can assign a value to the activity variable corresponding to the distance between IP addresses (e.g., between 0 and 1, where 0 is an exact match and 1 is a significant difference between the IP addresses).

Exemplary activity variables are provided in Table 1 below:

TABLE 1

| Category | Activity Variable | Description |
|---|---|---|
| Location | Change in IP address | Change in IP address from past sessions |
| | Proximity of IP addresses if there is a change | Measure of geographic proximity of the IP addresses |
| | Proximity to postal address | Measure of proximity of the IP address from the postal address on record |
| Unusual activity | Change in device | Change in the device used to access web application in past sessions |
| | Unusual login time activity | Measure of deviation from usual login time patterns |
| | Unusual transaction | Change in type of transaction performed by user based on past account history |
| | Account locked due to incorrect passwords | |
| | Recent password change | Measure of time from the last time the password was changed or reset |
| | Recent account activity | Any recent account activity that would increase the need for authentication. E.g.: new beneficiary was added |
| Activity Type | High risk transaction | Transaction belongs to a pre-identified list labelled as 'High risk' |

It should be appreciated that other activity variables can be devised and used within the scope of technology described herein. In some embodiments, each activity variable can be assigned a value corresponding to the evaluation of the underlying parameters—the value can be a binary value (e.g., 0 or 1), a decimal value (e.g., in a range between 0 and 1), or an alphanumeric string (e.g., "Yes" or "No").

Activity analysis module 106d creates (step 206) a multidimensional vector using the activity variables, to be used as input to one or more of the trained ML classification models 108a-108n. In some embodiments, module 106d also assigns a weight value to each activity variable—where the weight value represents the relative importance of each activity variable in authenticating the user. For example, the weight value can be a decimal value between 0 and 1, where variables with higher weight values can be considered as more relevant or more important to authentication. To create the multidimensional vector (V) for user authentication processing, module 106d can generate a vector value for each activity variable (AV) by multiplying the activity variable value and the weight value (w):

$$V = [(AV1 * w1), (AV2 * w2), (AV3 * w3), \ldots, (AVn * wn)]$$

The resulting multidimensional vector comprises the plurality of vector values, for example:

$$V = [0.34, 0.77, 0.19, 0.00, \ldots, 0.41]$$

The vector V can be considered as a feature set for the user authentication processing, and the ML classification models 108a-108n receive the vector as input for classification.

Once the vector is created, activity analysis module 106d executes (step 208) one of the trained ML classification models 108a-108n using the multidimensional vector as input to generate an anomaly score for the electronic signature request submitted by client computing device 102. As mentioned above, one or more of the ML classification models 108a-108n comprises a k-nearest neighbor (KNN) algorithm that is configured to classify the input vector based upon one or more vectors generated from historical user authentication data (e.g., electronic signature workflows or authentication requests that were initiated by the same user and/or client computing device). In some embodiments, ML classification models 108a-108n are configured to calculate a distance measure between each of the weighted values of the input multidimensional vector and values of one or more centroid vectors created from the historical user authentication data for the user.

Generally, KNN is a supervised ML algorithm frequently used for classification problems (sometimes regression problems as well) in data science. A KNN algorithm detects anomalies using the distance(s) between the input vector and k-nearest neighbor vectors as anomaly scores. The idea is that if an observation is very far from other observations, then that observation is considered to be an anomaly. In the context of the technology described herein, if an input vector representing the current electronic signature request is very different than vectors representing historical electronic signature workflow requests, then the current electronic signature request may be considered an anomaly (indicating that the activity is fraudulent or unauthorized). In some embodiments, module 106d uses a Euclidian distance function to determine the distance between the current input vector and the historical vectors. Additional detail regarding the operation and implementation of KNN algorithms is described in P. Cunningham and S. Delany, "k-Nearest Neighbour Classifiers 2nd Edition (with Python examples)," arXiv: 2004.04523v2 [cs.LG] 29 Apr. 2020, which is incorporated herein by reference.

Also, in some embodiments, the historical user authentication vectors are combined into one or more clusters, in order to improve the efficiency of the KNN algorithm. For example, one or more subsets of historical vectors can be grouped into a centroid vector—a vector which represents an average, or center, of the individual historical vector values. As an example, module 106d can execute a k-means clustering algorithm on the historical vectors to determine a number of vector clusters, each cluster having a corresponding centroid vector. n some embodiments, module 106d utilizes the MiniBatchKMeans( ) algorithm as implemented in the scikit-learn Python library (available from scikit-learn.org) to generate the clusters. This algorithm has a partial_fit( ) method which has the capability to update the clusters whenever new data is received by module 106d. Furthermore, in some embodiments, module 106d determines an optimal number of clusters k using the elbow method and distortion metric (as described in en.wikipedia.org/wiki/Determining_the_number_of_clusters_in_a-_data_set, which is incorporated herein by reference).

Figure 3:
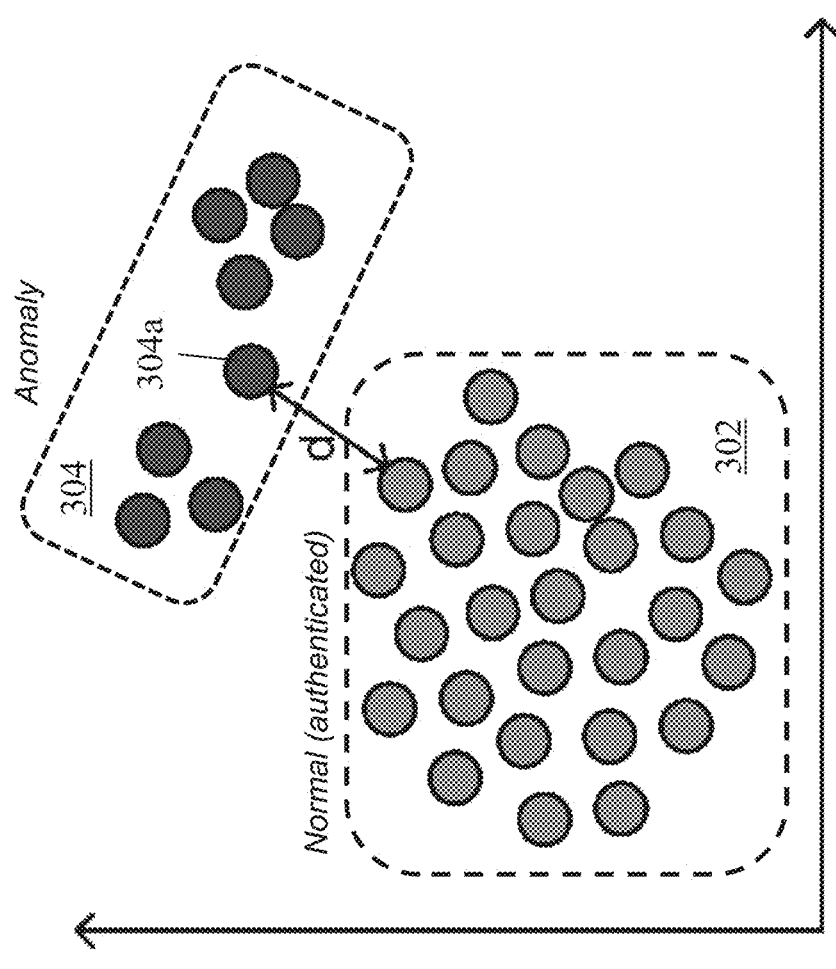
FIG. 3 is a diagram of an exemplary vector space representation for multidimensional vectors generated by the activity analysis module.

FIG. 3 is a diagram of an exemplary vector space representation 300 for the multidimensional vectors generated by module 106d. As shown in FIG. 3, a plurality of historical multidimensional vectors 302 (classified as authenticated activity of the user at client computing device 102) are positioned close to each other in the vector space—indicating that the vector values are similar to each other. One or more other multidimensional vectors 304 are separated from cluster 302—including vector 304a which represents the current electronic signature request and is separated from cluster 302 by distance d.

Depending upon the size/magnitude of d, activity analysis module 106d can take one or more actions to validate the current electronic signature request using additional authentication processes. In some embodiments, distance d is the anomaly score and is represented as a decimal value between 0 and 1, where 0 represents no or low risk of fraudulent or malicious activity (because the current input vector is close to the historical authenticated vectors) and 1 represents high risk of fraudulent or malicious activity (because the current input vector is far away from the historical authenticated vectors). Model 108 produces the value of distance d as the output anomaly score and activity analysis module 106d determines which authentication process to initiate based upon the anomaly score.

Figure 4:
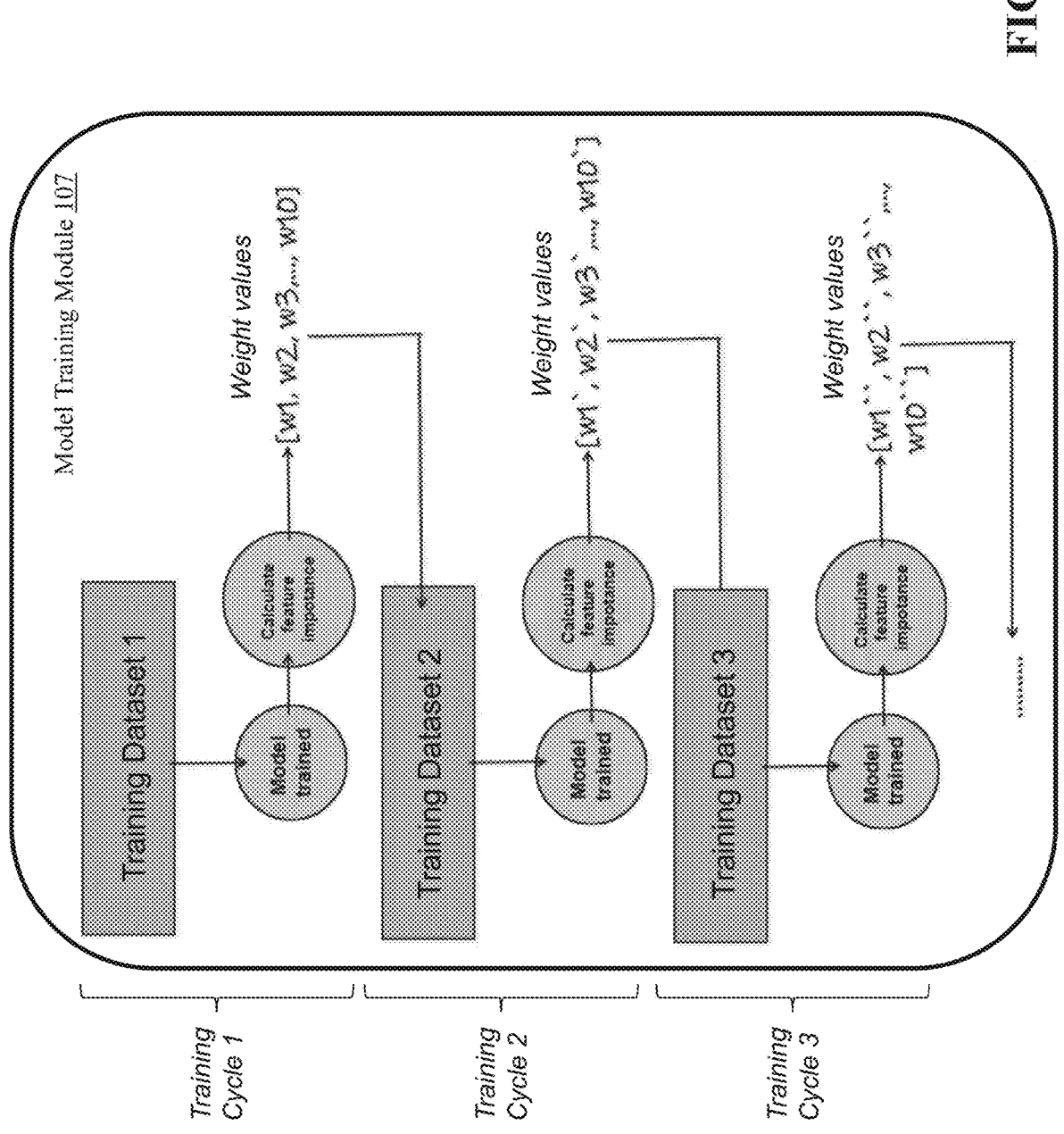
FIG. 4 is a diagram of an iterative classification model training process as performed by the model training module.

An important aspect relating to the ML classification model 108 is the ability for model training module 107 of server computing device 106 to both (a) initially train ML classification model 108 on a set of historical user authentication data and (b) periodically re-train model 108 as subsequent user authentication data is added to database 109. In some embodiments, ML model 108 is trained using a training dataset of vector data with the same weights assigned to all of the features. Once module 107 trains ML model 108 on the training dataset, module 107 calculates a feature importance value for all of the features in the training dataset. Module 107 then uses the feature importance values as weights for the next training dataset on which the model 108 is trained again. This training and re-training process is performed iteratively over a plurality of cycles, which enables the determination of desired/optimal weight values for all of the different features and parameters. FIG. 4 is a diagram of the iterative training process 400 as performed by model training module 107. As shown in FIG. 4, model training module 107 executes a plurality of model training cycles using different training datasets (e.g., as retrieved from database 109) to iterate on the weight values (w) for each feature to determine optimal weights for authentication.

Once model training module 107 has determined an optimized set of feature weights and the training dataset is large enough, module 107 can utilize unsupervised clustering algorithms instead of relying on supervised learning algorithms which require the data points to be marked with an output. The optimized set of feature weights can be used to tune the distance algorithms deployed in model 108 for unsupervised clustering.

Turning back to FIG. 2, once ML model 108 has generated an anomaly score (e.g., distance d) for the current electronic signature request, activity analysis module 106d determines (step 210) additional authentication requirements for the electronic signature request based upon the anomaly score. In some embodiments, activity analysis module 106d uses a tiered approach to assess the anomaly score and determine appropriate authentication requirements. For example, module 106d can use an anomaly score classification algorithm to assign the anomaly score to one of a plurality of classes that correspond to a level of risk (as shown in Table 2 below):

TABLE 2

| Anomaly Score Range | Authentication Requirements |
| --- | --- |
| 0.00-0.30 (Low Risk) | No additional authentication required |
| 0.31-0.80 (Normal Risk) | Multifactor Authentication (MFA) required |
| 0.81-1.00 (High Risk) | Signature Guarantee with Active Proofing required |

Figure 5:
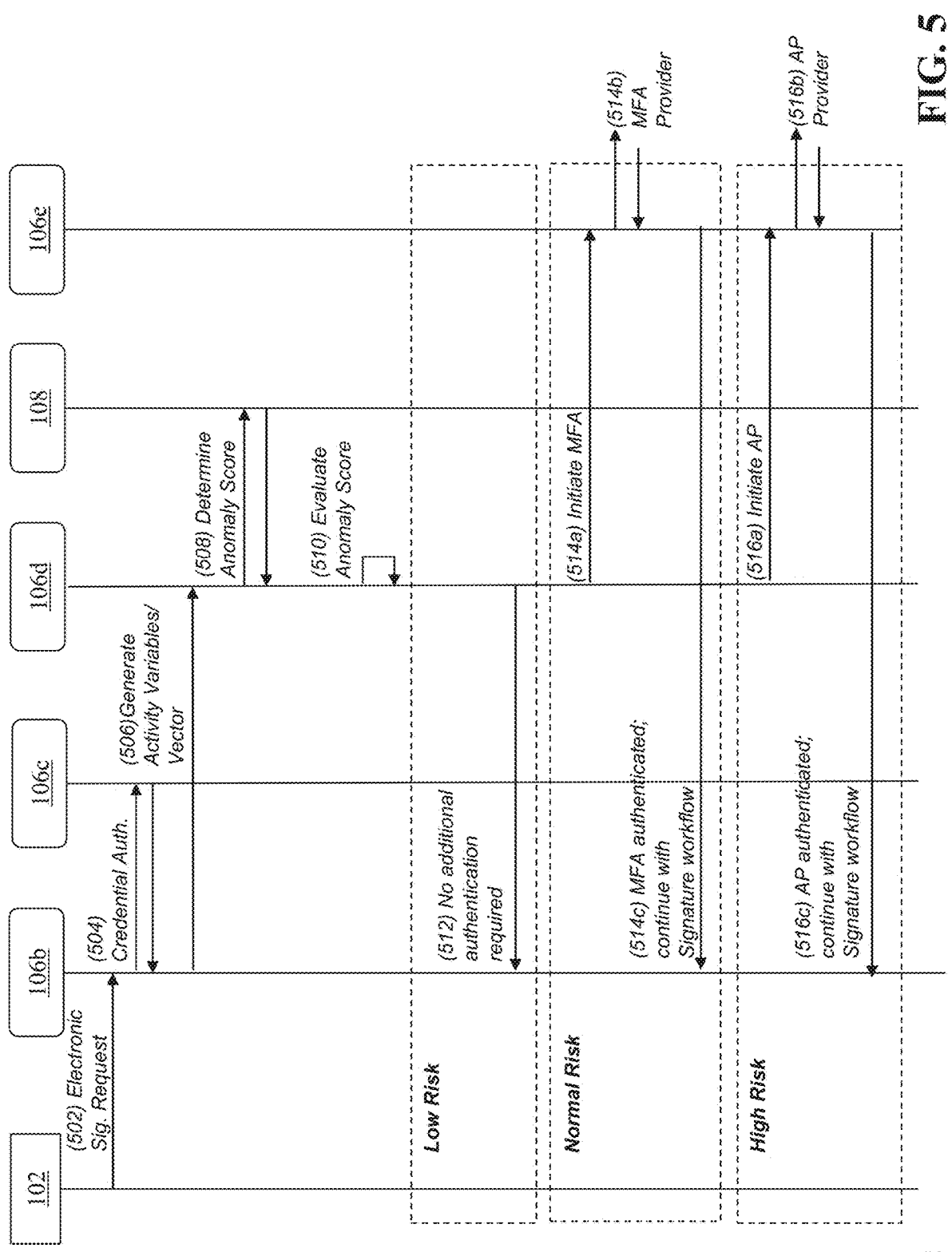
FIG. 5 is a diagram of an exemplary anomaly score evaluation and authentication requirement workflow process.

FIG. 5 is a diagram of an exemplary anomaly score evaluation and authentication requirement workflow performed by modules 106d and 106e. As shown in FIG. 5, a user at client computing device 102 submits (502) an electronic signature request and after the user credentials are authenticated (504), the activity variables are generated (506), and anomaly score is determined (508) using through model 108 (as described previously), activity analysis module 106d evaluates (510) the anomaly score generated by model 108.

In the case when the anomaly score is in the Low Risk range (e.g., 0.00 to 0.30), module 106d determines that the risk of fraud or malicious activity is low. As a result, no additional authentication is required and the user at client computing device 102 can continue with the electronic signing workflow. In this example, activity analysis module 106d transmits (512) an indication to signature workflow module 106b to continue with the currently active electronic signature workflow. In response to the indication, web application 110a can, e.g., invoke UI module 106a to generate additional user interface screens that comprise the remaining steps in the workflow for presentation on client computing device 102. The user at client computing device 102 can interact with the UI screen to complete the electronic signature process.

For situations where the anomaly score is in the Normal or High Risk range, module 106d determines that the risk of fraud or malicious activity is normal or high, which requires the initiation of an additional authentication process to verify the identity of the user. Module 106d initiates (step 212 of FIG. 2) the additional authentication requirements for the electronic signature request.

When the anomaly score is in the Normal Risk range, module 106d instructs (514a) multifactor authentication (MFA) module 106e to begin an MFA process. In some embodiments, MFA module 106e establishes (514b) a connection to one or more remote computing devices (not shown in FIG. 1) that are configured to carry out user authentication procedures via separate channels from client computing device 102. For example, MFA module 106e can connect to an MFA provider computing device, which transmits a one-time passcode (OTP) to a mobile computing device associated with the user (i.e., a device that is different from client device 102). MFA module 106e concurrently instructs UI module 106a to display a screen on client device 102 requesting that the user enter the OTP as displayed on the mobile computing device. The MFA provider validates the OTP provided by the user. If the OTP is valid, the MFA provider computing device transmits an indication to MFA module 106e of a successful user authentication. Module 106e instructs (514c) signature workflow module 106b to continue with the currently active electronic signature workflow. In response to the indication, web application 110a can, e.g., invoke UI module 106a to generate additional user interface screens that comprise the remaining steps in the workflow for presentation on client computing device 102. The user at client computing device 102 can interact with the UI screen to complete the electronic signature process.

When the anomaly score is in the High Risk range, module 106d instructs (516a) multifactor authentication (MFA) module 106e to begin an active proofing process. In some embodiments, MFA module 106e establishes (516b) a connection to one or more remote computing devices that are configured to carry out an active proofing procedure. For example, MFA module 106e can connect to an active proofing service provider, which transmits a request to client computing device 102 for additional authentication information from the user. The request may require the user to provide any of a number of additional data elements that verify the user's identity, including but not limited to biometric characteristics (e.g., facial scan, fingerprints, voice sampling), knowledge-based information (e.g., pre-established security questions and answers, life history questions), document validation (e.g., scanning of ID document or driver's license), and/or other types of active proofing techniques. MFA module 106e concurrently instructs UI module 106a to display a screen on client device 102 with instructions for the user to provide the additional authentication information. The active proofing provider validates the user authentication data provided by the user. If the data is valid, the active proofing provider transmits an indication to MFA module 106e of a successful user authentication. Module 106e instructs (516c) signature workflow module 106b to continue with the currently active electronic signature workflow. In response to the indication, web application 110a can, e.g., invoke UI module 106a to generate additional user interface screens that comprise the remaining steps in the workflow for presentation on client computing device 102. The user at client computing device 102 can interact with the UI screen to complete the electronic signature process. It should be appreciated that in some embodiments, system 100 can initiate a plurality of additional authentication procedures in order to validate the user's identity. For example, activity analysis module 106d can determine that both the MFA and the active proofing procedures should be initiated in order to verify the user's identity.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for user authentication during an electronic signature workflow, the system comprising a server computing device having a memory for storing computer-executable instructions and a processor that executes the computer-executable instructions to:

authenticate user credentials included in an electronic signature request received from a client computing device;

generate a plurality of activity variables based upon parameters associated with the electronic signature request, including:

identifying that a value of a first parameter associated with the client computing device is changed from a historical value for the first parameter, determining a proximity of the first parameter to a second parameter associated with the client computing device, generating a first activity variable comprising an indicia that the value of the first parameter is changed from the historical value, and generating a second activity variable comprising the proximity of the first parameter to the second parameter;

create a multidimensional vector using the activity variables, the vector including a plurality of values each associated with an activity variable and having a weight assigned to each value;

execute a trained machine learning classification model on the multidimensional vector to generate an anomaly score for the electronic signature request;

determine additional authentication requirements for the electronic signature request based upon the anomaly score;

initiate the additional authentication requirements for the electronic signature request, including validating user authentication data received from one or more remote computing devices; and retrain the trained machine learning classification model on updated user authentication data to derive new weights for multidimensional vectors.

2. The system of claim 1, wherein the user credentials comprise one or more of: a username, a password, a personal identification number (PIN), and a token.

3. The system of claim 1, wherein the parameters associated with the electronic signature request comprise one or more of: an IP address of the client computing device, a MAC address of the client computing device, location coordinates associated with the client computing device, a transaction type, a request timestamp, and the user credentials.

4. The system of claim 3, wherein the activity variables comprise a change in the IP address, a proximity of the IP address to a prior IP address of the client computing device, a proximity of the IP address to a postal address of the user, a deviation of the request timestamp from an expected request timestamp, a deviation of the transaction type from an expected transaction type, a change in the user credentials, an account lock event associated with the user, account activity associated with the user, and identification of the transaction type on a predetermined list of transactions.

5. The system of claim 1, wherein the trained machine learning classification model comprises a K-nearest neighbor (KNN) algorithm.

6. The system of claim 5, wherein the trained machine learning classification model generates the anomaly score based upon a distance measure between each of the weighted values of the multidimensional vector and values of one or more centroid vectors associated with the user.

7. The system of claim 6, wherein the centroid vector is based upon historical authentication activity associated with one or more of: the user and the client computing device.

8. The system of claim 1, wherein the server computing device determines that no additional authentication requirements for the electronic signature request are required when the anomaly score falls below a predefined value.

9. The system of claim 1, wherein the server computing device determines that multifactor authentication is required when the anomaly score is above a first threshold value.

10. The system of claim 9, wherein initiating the additional authentication requirements for the electronic signature request comprises instructing a first remote computing device to issue a multifactor authentication request to the client computing device.

11. The system of claim 10, wherein validating user authentication data received from one or more remote computing devices comprises receiving an indicator from the first remote computing device that the client computing device has successfully responded to the multifactor authentication request.

12. The system of claim 1, wherein the server computing device determines that active identity proofing is required when the anomaly score is above a second threshold value.

13. The system of claim 12, wherein initiating the additional authentication requirements for the electronic signature request comprises instructing a second remote computing device to request information comprising one or more of: personally identifying information, identification document information, and biometric identity information from the user of the client computing device.

14. The system of claim 13, wherein validating user authentication data received from one or more remote computing devices comprises receiving an indicator from the second remote computing device that the user has successfully responded to the information request.

15. A method of user authentication during an electronic signature workflow, the method comprising:

authenticating, by a server computing device, user credentials included in an electronic signature request received from a client computing device;

generating, by the server computing device, a plurality of activity variables based upon parameters associated with the electronic signature request, including:

identifying that a value of a first parameter associated with the client computing device is changed from a historical value for the first parameter, determining a proximity of the first parameter to a second parameter associated with the client computing device, generating a first activity variable comprising an indicia that the value of the first parameter is changed from the historical value, and generating a second activity variable comprising the proximity of the first parameter to the second parameter;

creating, by the server computing device, a multidimensional vector using the activity variables, the vector including a plurality of values each associated with an activity variable and having a weight assigned to each value;

executing, by the server computing device, a trained machine learning classification model on the multidimensional vector to generate an anomaly score for the electronic signature request;

determining, by the server computing device, additional authentication requirements for the electronic signature request based upon the anomaly score;

initiating, by the server computing device, the additional authentication requirements for the electronic signature request, including validating user authentication data received from one or more remote computing devices; and retraining, by the server computing device, the trained machine learning classification model on updated user authentication data to derive new weights for multidimensional vectors.

16. The method of claim 15, wherein the user credentials comprise one or more of: a username, a password, a personal identification number (PIN), and a token.

17. The method of claim 15, wherein the parameters associated with the electronic signature request comprise one or more of: an IP address of the client computing device, a MAC address of the client computing device, location coordinates associated with the client computing device, a transaction type, a request timestamp, and the user credentials.

18. The method of claim 17, wherein the activity variables comprise a change in the IP address, a proximity of the IP address to a prior IP address of the client computing device, a proximity of the IP address to a postal address of the user, a deviation of the request timestamp from an expected request timestamp, a deviation of the transaction type from an expected transaction type, a change in the user credentials, an account lock event associated with the user, account activity associated with the user, and identification of the transaction type on a predetermined list of transactions.

19. The method of claim 15, wherein the trained machine learning classification model comprises a K-nearest neighbor (KNN) algorithm.

20. The method of claim 19, wherein the trained machine learning classification model generates the anomaly score based upon a distance measure between each of the weighted values of the multidimensional vector and values of one or more centroid vectors associated with the user.

21. The method of claim 20, wherein the centroid vector is based upon historical authentication activity associated with one or more of: the user and the client computing device.

22. The method of claim 15, wherein the server computing device determines that no additional authentication requirements for the electronic signature request are required when the anomaly score falls below a predefined value.

23. The method of claim 15, wherein the server computing device determines that multifactor authentication is required when the anomaly score is above a first threshold value.

24. The method of claim 23, wherein initiating the additional authentication requirements for the electronic signature request comprises instructing a first remote computing device to issue a multifactor authentication request to the client computing device.

25. The method of claim 24, wherein validating user authentication data received from one or more remote computing devices comprises receiving an indicator from the first remote computing device that the client computing device has successfully responded to the multifactor authentication request.

26. The method of claim 15, wherein the server computing device determines that active identity proofing is required when the anomaly score is above a second threshold value.

27. The method of claim 26, wherein initiating the additional authentication requirements for the electronic signature request comprises instructing a second remote computing device to request information comprising one or more of: personally identifying information, identification document information, and biometric identity information from the user of the client computing device.

28. The method of claim 27, wherein validating user authentication data received from one or more remote computing devices comprises receiving an indicator from the second remote computing device that the user has successfully responded to the information request.

* * * * *